United States Patent [19]

Pitts et al.

[11] Patent Number: 4,758,350

[45] Date of Patent: Jul. 19, 1988

[54] PROCESS AND APPARATUS TO REMOVE SEPARATED WATER FROM CONTAINED HYDROCARBON FUEL

[76] Inventors: Jerry O. Pitts, Rte. #1, Box 34-L; Jack L. Pitts, Rte. #1, Box 48, both of Cheney, Wash. 99004

[21] Appl. No.: 897,932

[22] Filed: Aug. 19, 1986

[51] Int. Cl.$^4$ .............................................. B01D 15/00
[52] U.S. Cl. .................... 210/679; 210/689; 210/243; 210/282; 210/484
[58] Field of Search ............. 210/679, 689, 237, 238, 210/282, 416.4, 416.5, 484, 502.1, 504, 506–508, 243; 208/187, 188; 585/830

[56] References Cited

U.S. PATENT DOCUMENTS

4,358,380  11/1982  Hasegawa et al. ................. 210/679
4,419,236  12/1983  Hsu ................................. 210/689
4,588,505   5/1986  Walley et al. ..................... 210/502.1

*Primary Examiner*—Ivars Cintins
*Attorney, Agent, or Firm*—Keith S. Bergman

[57] ABSTRACT

A highly hydrophilic material that does not absorb hydrocarbon fuel is contained in a fabric tube, lowered by a drawstring to the bottom of a fuel container, there maintained until water at that position is extracted and thereafter removed for disposition. The hydrophilic material is preferably a graft polymerized starch or gelable polysaccharide such as agarose. The fabric container must be densely woven with fine intracies to contain the hydrolyzed hydrophilic material during placement and especially against fluidic heads during extraction. The fabric material is coated with polymeric material insoluble in hydrocarbon fuel but soluble in water, such as polyvinyl alcohol, to keep the fabric free of hydrocarbon encroachment during initial placement. Static electricity is removed from the system by coating the fabric material with antistatic agents of a surfactant nature and providing a conducting system which is externally grounded. The extraction device is weighted by dense particulate material such as sand, which with the hydrophilic material is distributed for maximum operative efficiency.

14 Claims, 2 Drawing Sheets

PROCESS AND APPARATUS TO REMOVE SEPARATED WATER FROM CONTAINED HYDROCARBON FUEL

BACKGROUND OF INVENTION

1. Related Applications

There are no applications related hereto heretofore filed in this or any foreign country.

2. Field of Invention

Our invention relates generally to the removal of separated water from a hydrocarbon fuel container by absorption and to a process, materials and apparatus for so doing.

DESCRIPTION OF PRIOR ART

In the storage of insoluble organic fluids and particularly hydrocarbon fuels the accumulation of water from atmospheric condensation or otherwise is an ever present problem. Such water has heretofore been dealt with and removed by various means but principally by either mechanical separation with subsequent pumping or by absorption in some hydraphilic material with subsequent removal. The instant invention adds a new and novel member to the latter class of process.

In general for a hydrophilic substance to be useful in absorbing water from a bulk mass of liquid hydrocarbon the absorbent material must not absorb that hydrocarbon. Various such absorptive compounds have heretofore become known, most of which have been of a vegetative nature such as Sterculia lynchnophora Hance powder as heretofore described by Charles Jui-cheng Hsu in his U.S. Pat. No. 3,745,659 and various other related patents. Such substances are reasonably operative if properly handled, but they are relatively expensive and not generally available in ordinary commerce. We have found that various synthetic compounds such as starch substrata grafts polymerized with acrylonitrile, various polyacrylomides and refined natural products such as agarose, the gelable faction of agar, may be used in such processes, are more readily available and of lower cost. These later products in general are not reactive to many liquid organic compounds and particularly to hydrocarbon fuels, though they do require specialized procedures and apparatus for effective use. Our invention differs from the prior art by making use of the hydrophilic properties of such compounds to remove water from hydrocarbon fuels.

To be effective for the purposes of our invention, the hydrophilic material must be enclosed in some sort of a container to keep it in a reasonably consolidated mass and allow its transport and storage. The density of common hydrocarbon fuels is less than that of water so in a container acted upon by gravity, separated and contained water will accumulate in the bottom with the hydrocarbon fraction thereabove. Most commonly in storage facilities access is from an upper position and this geometry requires that the hydrophilic material be moved through the mass of hydrocarbon to reach and react with separated water and thereafter be again moved through that mass of fuel to be extracted for disposition. This containerization requirement presents problems which must be properly resolved for our invention to be operative.

Firstly, the containment material must contain the hydrophilic material both before and after its reaction with water and yet must be such as to allow the relatively free passage of water therethrough. The material must not have orifices of any substantial size because in general the hydrophilic material in dry form is finely particulated and has a tendency to work its way through pores of any substantial size, especially when it absorbs water and swells. When the hydrophilic material has formed a gel, the agglomerated mass is not overly cohesive and it again may be forced through pores in the containment material on removal against a hydraulic head if pores be of any substantial size. We have found that a tightly woven cloth formed from untwisted yarn-type fibers that are wetted by water will serve the purposes of our invention, but loosely woven materials of the prior art having well defined pores of a size greater than approximately 200 microns are not efficiently operative.

Such fabric as used to contain a hydrophilic material generally is wetted by hydrocarbon fuels as well as water and, since the fabric must pass through such fuels before it comes to the water faction, the material oftentimes absorbs that fuel and by reason thereof prevents water from entering through the fabric for a substantial period of time, if at all. To alleviate this problem we coat the fabric container with the coating material that is not soluble in hydrocarbon fuels, substantially prevents such materials from entering the fabric fiber and somewhat fills the intracies of the fabric so as to hinder or prevent the passage of those fuels therethrough, but yet is water soluble so as to readily dissolve in and be removed by water. A substance that we have found ideal for such purposes is polyvinyl alcohol and some vinyl monomers. This material also aids in maintaining the dry particulated hydrophilic material within the container because of filling intracies and prevents the hydrocarbon fuel from contacting fabric fiber surfaces to lessen their ability thereafter to pass water. Prior art containers for hydrophilic materials have generally not used such coating on containers but rather have allowed the container material to become coated with hydrocarbon fuel to lessen or prevent its ability to pass water therethrough and slow its reaction time.

The distribution of dry hydrophilic material within a container also presents some problem. In general, the containers for such material are somewhat limited in their shapes as the containers normally must pass through a relatively small orifice structure in a tank for both insertion and removal. Since to be useful there must be some reasonable volume of contained hydrophilic material and since that volume swells substantially upon hydration, the containers are rather constrained geometrically to a long cylindrical shape. The prior art generally has merely provided for placement of the hydrophilic material loosely within a container and has not otherwise positionally maintained it. We have found, however, that this construction is deleterious to the action of the hydrophilic material because that material will tend to accumulate in a coherent mass of low surface area relative to its volume and this tends to slow reactions with water, and in extreme cases may even prevent reaction in the medial part of a mass of material. In contradistinction, we provide distribution of the hydrophilic material somewhat uniformly throughout the container, either by partitioning the container into a plurality of areas each containing a part of the hydrophilic material or by providing secondary containment of the material in a container that will burst by reason of swelling of the hydrophilic material when it reacts with water. This type of containment further aids the weighting of a container, if particulate weighting material be used, as it more uniformly distributes the weighting material.

Static electricity presents a major problem in using the device. The static may be generated by motion of a container through hydrocarbon fuel, by the particulate hydrophilic material contained in the container, by the electrical and chemical natures of the materials themselves, or by a multitude of other causes. We therefore provide antistatic materials of a surfactant nature in or on the container itself and have provided a grounding system with conductors well distributed throughout the container and passing therefrom and through the tank, in association with a draw line, to its exterior where they may be grounded. Prior Art devices seem in general not to have considered the static problem and generally have not provided effective means for control of static electricity.

The particular hydrophilic material that we use in our process also differs substantially from the prior art by reason of the amount of water that it will absorb or that might be extracted with it. In general, the natural and substantially unrefined vegetative matter that is hydrophilic and not reactive to hydrocarbon fuels has absorbed not more than 50 times its volume of water, and in most cases about 20 times. The particular manufactured materials that we use will effectively absorb and remove at least 200 times their volume in water and may even absorb substantially greater amounts up to 2,000 times their volume depending upon particular conditions. This tends to lower costs for the required amounts of materials and tends to make use and disposition after use much simpler and more economical. In fact, the hydrophilic materials we use may even be dried and reused, if desired, but generally their cost is low enough that they are readily expendable.

Our invention differs from the prior art not in any one of these features or structures per se, but rather in the synergistic combination of all of them to provide the functions that necessarily flow therefrom.

SUMMARY OF INVENTION

Our invention generally provides apparatus and method for removing water separated from a contained volume of hydrocarbon fuel.

A particulated hydrophilic material is contained in a peripherally defined fabric bag container, transported to the part of a container where separated water has accumulated, the water is allowed to absorb in the hydrophilic material and the then gelled material is removed, with contained water, for disposition. The hydrophilic materials preferred are a gelable composition prepared by graft polymerizing acrylonitrile onto flour or other starch containing substrata with subsequent alkaline saponification; a polymerized or co-polymerized acrylomide; or the agarose fraction of agar, separated by acetylation with subsequent chloroform extraction and deacetylation by saponification. The material from which the containing bag is formed is a fabric tightly woven of untwisted synthetic yarn without significant orifices that is coated with a material that is insoluble in hydrocarbon fuels but soluble in water, such as polyvinyl alcohol, to protect contents from hydrocarbon fuels during transit therethrough. The hydrophilic material is distributed within the container to provide a higher ratio of surface area to volume then if the material were naturally amassed. Weighting material of relatively high density is carried within the container to increase the overall composite density above that of water to allow gravity placement. The container fabric is coated with antistatic material and provided with grounding elements which are associated with a manipulating cord to allow external grounding outside a tank being serviced. The container may be provided with antimicrobal agents, if required.

The shape of the container is of an elongate nature to allow access through a small tank orifice. The hydrophilic and weighting material may be dispersed in the fabric bag by creating a plurality of separate containment chambers or by containment in secondary structures that burst upon hydration of the contained material. The hydrophilic material may be reclaimed by dehydrating, or may be wasted as a beneficial soil additive.

In creating such a process and apparatus, it is:

A principal object of our invention to provide particular hydrophilic material in a particular container to efficiently and economically remove separated water from hydrocarbon fuel in containers.

A further object of our invention to provide hydrophilic material for such a device comprising a gelable composition prepared by graph polymerizing acrylonitrile onto flour or other starch containing substrata with subsequent alkaline soponification; a polymerized or co-polymerized agarose acrylomine; or by fractionating agar by acetylating, separating the agarose fraction by chloroform extraction, and subsequently saponifying.

A further object of our invention to provide a container that is coated with an antistatic agent and embodies a well distributed conductive system with external ground to prevent static sparking within a fuel tank.

A still further object of our invention to provide weight in such a device, to allow gravity placement, by means of particulated material such as sand which may be distributed with the hydrophilic material.

A still further object of our invention to provide a container that maintains its dry components in geometrical configurations having relatively high surface area to volume ratios by means of secondary containers that are distributed throughout the primary container or that burst upon swelling of the contained hydrophilic material to thereafter allow that material to occupy the primary container chamber.

A still further object of our invention to provide such a process and apparatus that is of new and novel design, of rugged and durable nature, of simple and economic manufacture and otherwise well suited to the uses and purposes for which they are intended.

Other and further objects of our invention will appear from the following specification and accompanying drawings which form a part hereof. In carrying out the objects of our invention, however, it is to be understood that its essential steps and features are susceptible of change in design, ordering and structural arrangement with only preferred and practical embodiments being illustrated in the accompanying drawings as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

Our invention generally provides container 20 carrying hydrophilic material 23 and connected to manipulation cord 22 for placement in tank 24 to remove separated water therefrom. Species provide burstable secondary containment bags 21 within container 20 to carry hydrophilic material in particular configurations.

Figure 1:
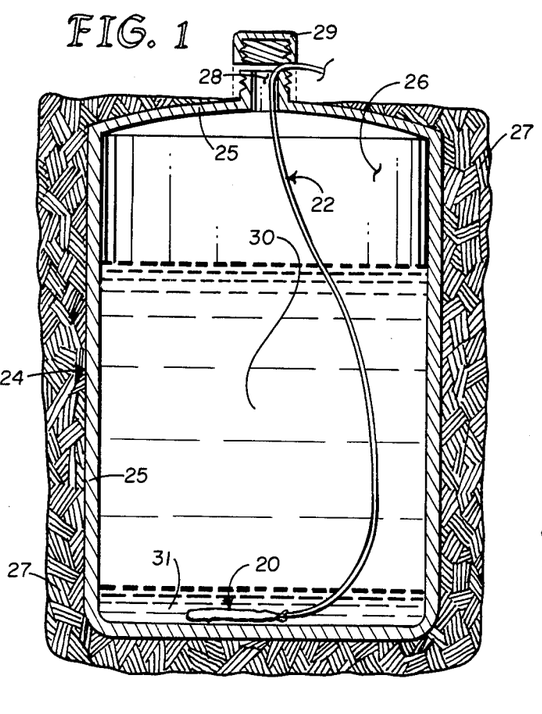
FIG. 1 is a somewhat idealized cross-sectional view through a buried fuel tank showing our invention in place therein for removal of water therefrom.
Figure 2:
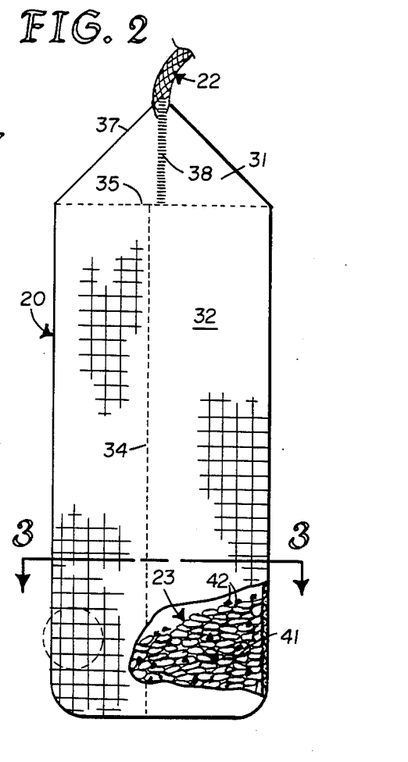
FIG. 2 is an orthographic surface view of the container of our invention, partially cut away to show its contents.

A section through a typical hydrocarbon fuel containment tank 24 is shown in FIG. 1. Commonly such tanks are peripherally defined by rigid sheet-like element 25 to define at least one containment chamber 26. The peripheral element 25 is commonly formed of metal. The tanks are buried in earth 27 for safety and to provide thermal insulation. Access to such structures is commonly had by an orifice 28 generally projecting outwardly some distance from the peripheral tank element 25 and covered by releasably fastenable cap 29. Such tanks commonly will contain a substantially larger volume of hydrocarbon fuel 30 and a smaller volume of water 31, which by reason of the density differentials will accumulate in the lowest portion of the tank. Oftentimes such tanks are positioned in the ground at an angle to the horizontal or provided with some type of a depending trap structure to concentrate separated water in a more coherent volume. Our container 20 is shown, suspended from its manipulation cord 22, in this tank in operative position for water removal.

Such fuel tanks commonly collect and accumulate water over a period of time, primarily as condensate from the atmosphere, as the tanks normally are vented in one fashion or another to the ambient atmosphere and if not, normally are not completely sealed against some gaseous transfer therefrom. Undoubtedly a part of the water may come from the fuel itself and possibly from other sources. Whatever the source, water is not desirable in fuel tanks as it tends to contaminate the fuel if it be removed therewith, it tends to cause corrosion of the tanks themselves, and it may tend to serve as an environment to aid the existence and propogation of various deleterious algaes and other microbal organisms.

Figures 3, 4, 6:
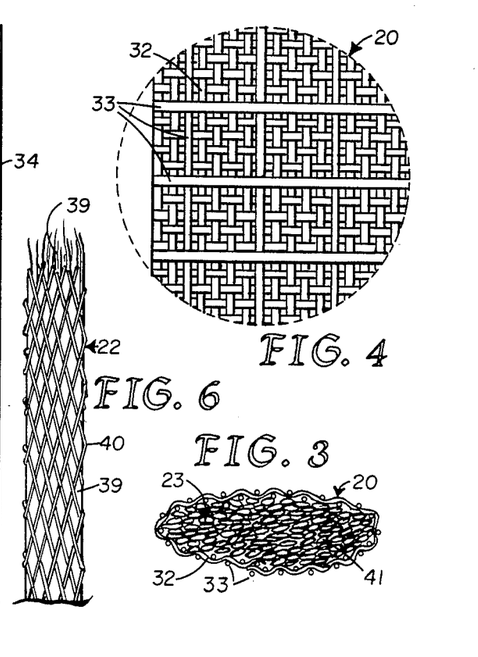
FIG. 3 is a cross-sectional view through the container of FIG. 2, taken on the line 3—3 thereon in the direction indicated by the arrows.
FIG. 4 is an enlarged view of a portion of the container of our invention, showing the weave of the cloth covering and static discharge wires embedded therein.
FIG. 6 is a partial view of a section of the manipulation cord showing especially its braided static discharge covering.

Container 20 is peripherally defined by fabric element 32 shown in the enlarged view of FIG. 3 in some detail. This fabric is woven with square warp and weft, both formed preferably of an untwisted, filamentuous yarn such as of nylon or rayon so as to have no well defined porosity between distinct threads, as would exist in a hard-twisted yarn. Preferably the material has no well defined orifice structure in a size range above approximately 100 microns but yet has substantial strength and little stretch type deformation either wet or dry. This type of fabric is required to contain both the dry particulated hydrophilic material and especially to contain that material after hydration when it has formed a gel. The dry material has a tendency to work its way through a containment fabric, especially when it starts hydration, apparently by reason of the particulate material becoming embedded in the fabric and moving the fibers of that fabric as it begins swelling upon hydration, so that the material may move exteriorly of the fabric during or after hydration. This is particularly evidenced by the accumulation of hydrophilic material commonly used with our invention on the exterior surface of a container if that container passes across a water hydrocarbon interface. Similarly gel structures formed by the hydrophilic material may not be too cohesive, especially when hydrated to a high water content. In such condition if the container fabric be not substantially continuous with no major porosity, the hydrated gels may not be contained, but rather may pass through pores in the container, especially under influence of a hydrostatic head commonly present or during the motion required for removal.

The fabric element also preferably carries an interconnecting network of conductive wires 33 to allow the free and easy discharge of electrostatic electricity that might accumulate in or on the surface of the fabric. Preferably these conductive wires are woven directly into the fabric, as illustrated in FIG. 3, though they may be placed by other means such as by adhesion on the surface of the fabric, in seams or like. The smaller the cells defined between adjacent peripheral wires the better the electrical discharge from the container will be and the less likely the probability is of creating sparking from any static electricity associated with the container. The conductive wires electrically communicate with electrically conductive sheath 32 about manipulative cord 22 for external grounding.

Container 20 is formed in an elongate cylindrical configuration substantially as illustrated. Its peripheral shape must be such as to allow it to pass through tank orifice 28 when the material carried therein be either dry or hydrated. Normally tank orifices 28 will be circularly cylindrical with diameters in the range of 3 to 4 inches and the container therefore must be of a cross-section to readily accomplish passage through this orifice. The material from which the container is formed must be such as to reasonably well maintain this configuration. The fabric must not stretch particularly upon wetting and must have sufficient fiber and yarn strength and appropriately tight weave to prevent any substantial configurational changes. For this reason I prefer to form the fabric 32 of synthetic fibers such as nylon or rayon, though undoubtedly other materials might be used if not so efficiently. The square weave of the warp and weft tend also to aid in maintaining dimensional and cross-sectional stability.

The container normally will be formed from a flat, pattern, somewhat as illustrated in FIG. 6, with elongate or vertical side seams 34, top seam 35, and bottom seam 36. The element is formed by sewing the side seams together in overlapping relationship, sewing bottom seam 36 in overlapping adjacency, turning the element inside out and then forming the top in folded triangular configuration along the fold lines 37 indicated and sewing the seam 38 therein. If desired, the seams of the container may be sewn with electrically conductive material, especially a resiliently deformable, electrically conductive metallic wire. The method of formation of this structure is not critical to our invention so long as the seams be tightly and durably formed and they well may be formed by other of the various methods known in the modern fabric arts, though if adhesives be used they obviously must be such as not to be affected by either water or hydrocarbon fuels.

Manipulative cord 22 is formed of flexible cording 39, commonly of cotton or synthetic fiber, with one end fastened, in the upper portion of container 20. In the illustrations grommet 47 is established in the upper portion of the container and cord 22 passed therethrough and knotted upon itself thereabove. The cord fastening may be accomplished by other means, such as sewing, adhesion or the like.

Figure 5:
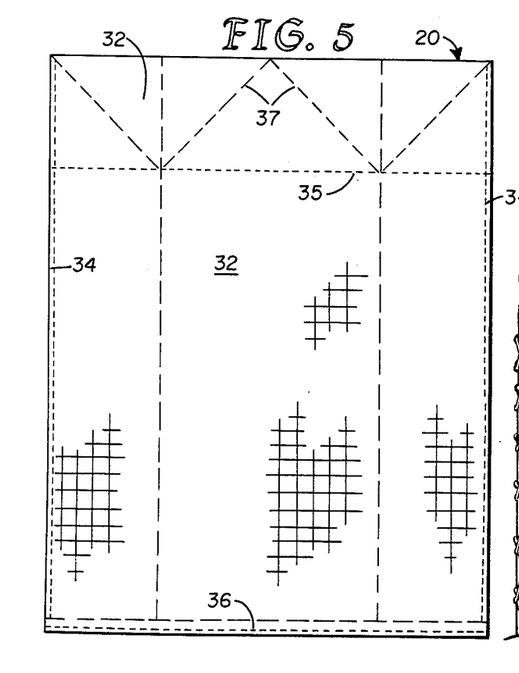
FIG. 5 is an orthographic plan view of the unassembled covering of our container showing its pattern.

Preferably conductive wires 33, if carried within the fabric of container 20, will be extended to cover cord 39 about its periphery in a net-like fashion, as illustrated in FIG. 5. If these wires be not continuous, some form of electrically conductive path will be established in or on cord 39 and electrically interconnected with container 20, and particularly the conductive wires 30 contained therein or associated therewith, so that the manipulative cord may serve as a conduit form the container to the tank orifice and outside thereof to allow electrical grounding of the container externally of the tank to be serviced. Cord 39 must have length sufficient to allow placement of the container 20 in a tank to be serviced and extend therefrom a distance sufficient to allow grounding. The cord also must have appropriate physical strength to serve its purposes and particularly to remove a container of hydrated hydrophilic material from a tank.

Fabric element 32 of container 20 is coated with a material insoluble in hydrocarbon fuels that tends to make the fabric impervious to that fuel during the initial passage of the container therethrough. This coating tends to prevent the fuel from wetting the fibers forming the fabric element and tends to some degree to fill, close or make smaller any orifices in that fabric, to make it more impervious to the fuel and prevent passage of hydrophilic material therethrough. This coating material must, however, be pervious to water impinging upon the container or else it would limit or prevent the hydration of the hydrophilic material within the container. The material preferably should be readily soluble in water. The coating of our container with such material may not be necessary but it substantially aids and makes more efficient the passage of water therethrough and its absorption by contained hydrophilic material. Since the hydrophilic material is not particularly reactive with hydrocarbon fuel, the impingement of that fuel thereon will not destroy its activity but if the fuel accumulates on the surface of the hydrophilic granules it may tend to lessen contact with and affinity for water. Secondarily, the hydrocarbon fuel, if it wets the fabric from which container 20 is formed, will tend to prevent the passage of water therethrough, especially in view of the tight weave of this fabric, and will tend to prevent water coming into the container chamber to physically contact the hydrophilic material and allow hydration thereof.

The material that we prefer for container fabric coating is polyvinyl alcohol. This material, as produced by hydrolysis of polyvinyl acetate, is highly resistant to hydrocarbon fuels. It is quite soluble in water to form a somewhat viscous solution, but its dry tenacity is outstanding. Acrylomide may also be used, if not so well. Either material is coated on fabric element 32 by immersion of that fabric in a fluidic solution of polyvinyl alcohol and the coated material thereafter allowed to dry. Preferably a coating is established to the extent of approximately one percent by weight of the fabric involved, though obviously the amount of coating may be varied through a wide range to accomplish the desired purposes set forth.

Antistatic material of a surfactant nature may be coated upon fabric element 32, either contemporaneously with the polyvinyl coating, or before or after. Most of the known antistatic agents are operable with our invention and tend to lessen potential static problems that may be associated with its use. The preferred antistatic agent is some sort of a sulfonic acid, alkyl aryl sulfonate, polyglycol, or phosphoric acid derivative that is not particularly soluble in hydrocarbons. Common antistatic agents used by textile manufacturers generally are operative with our invention, such as Arrotex Antistatic D as manufactured by the American Cyanamide Company, Avitex DN as manufactured by Dupont Chemical Company or Zero C as manufactured by the Lutex Chemical Company.

The hydrophilic material of our invention must have the potential of reacting with a substantial mass of water in a reasonably short period of time to form a gel having sufficient viscosity and cohesion to allow removal from the place of hydration within a hydrocarbon tank to the exterior thereof. Such material must also be non-reactive with the hydrocarbon fuel and its hydrating potential must not be deletereously affected thereby. The material must also be insoluble or substantially insoluble in hydrocarbon fuel and must not affect that fuel in its normal uses.

Such a material that we prefer for our invention is an absorbent polymeric compound prepared by graft polymerizing acrylonitrile onto flour or other starch containing substrata and then subjecting the flour-polyacrylonitrile graft copolymers to alkaline saponification. Such material is described in U.S. Pat. No. 4,045,387 heretofore issued to George F. Fanta and William N. Doane on Aug. 30, 1977. The material is particularly desirable because it is capable of absorbing from 1,800 to 3,000 times its weight of deionized water and still maintaining a gel of sufficient coherence and viscosity to be removable as an agglomerated mass in a fabric container from a fuel tank.

Another material operative with our invention is acrylomide, as produced by the American Cyanamide Company of Wayne, N. J. This material has the imperical formula $CH_2=CHCONH_2$ with a molecular weight of 71.08, a melting point of approximately 84.5 degrees centigrade and an apparent density of approximately 1.122 grams per cubic centimeter. Its solubility in water is approximately 204 grams per 100 milliliters at 30 degrees centigrade and generally less than 1 gram per milliliter in common hydrocarbon fields.

Another material that possesses appropriate characteristics to fulfill the purposes of our invention is agarose. This material is the gelling component refined from agar generally by acetylation with subsequent chloroformic extraction and deacetylation of the agarose component by soponification. The product is commercially available in various forms and derived by various extraction processes. Agarose basically is a linear galactan hydrochlorid that most commonly is isolated from agar but may be recovered directly from agar bearing marine algae. The material generally is not affected significantly, or its hydration prevented, by exposure to hydrocarbon fuels. The material generally is not affected significantly, or its hydration prevented, by exposure to hydrocarbon fuels. The material does not, however, absorb nearly the amount of hydrating water that the flour-acrylonitrile material does and generally does not form a gel with strength nearly so great as that latter material, even with proportionately lower amounts of water.

Various other compounds, of either natural or chemical origin, that form gels upon hydration are susceptible of use with our invention. Many similar starch compounds that form water gels and are reasonably impervious to hydrocarbon fuels and not particularly affected by them in either solid or gelled state. Many and various such compounds are known in present day commerce and some are described in the Fanta, et al., patent, supra. Undoubtedly unrefined agar is usable as are many other poly-sacchrides, poly-dextrines or starches, though none have been found to possess the desirability or economics of the graft polymerized acrylonitrile-starch compounds.

In general, the particulated hydrophilic material 41 and container 20 both have densities less than water and therefore will tend to float on water. Their densities might even be low enough that they may float on some hydrocarbons. Because of this some means must be used to cause the assembled container and its contents to sink, by reason of action of gravity, through both hydrocarbon fuel and water. I prefer to accomplish this by using some relatively dense, inexpensive, particulated inert material such as sand to raise the composite density of our container and its contents above that of water. Ordinary silica sands are preferred for this purpose, though other particulate materials of appropriate density and chemical inactivity may also fulfill the purposes of our invention.

We prefer to mix this inert weighting material 42 with the hydrophilic material so that the weight may be reasonably uniformly distributed throughout the container. This obviously is not necessary, but if the weighting material be allowed to agglomerate in a coherent mass, it may affect the ultimate orientation of the container 20 in a fuel tank, and particularly with an elongate type container may cause that container to assume a position with its longer axis vertical which may not be desirable.

If metal tanks are to be operated upon and if they be formed of a magnetically permeable material, the weighting material may constitute a magnetic substance. The weighting material might be metallic slugs or the like, as used in the prior art, but such material tend to be expensive, tend to concentrate weight in reasonably small areas and may be corrodable and present various chemical residues which may pass into and adversely affect a hydrocarbon fuel.

The volume of hydrophilic material must be regulated in relation to the total volume enclosed by container 20 to allow appropriate expansion for gel formation. These parameters may readily be determined emperically or by known engineering means, but should be such as to allow the hydrophilic material to expand without constraint to the fullest extent of its gel forming capabilities. Volume-wise, with finely particulated acrylonitrile-starch materials, this is in the 50 to 1 ratio, or somewhat greater, and will vary according to the nature of other hydrophilic materials and the extent of their particulization.

Because of the relatively small volume of hydrophilic material and weighting material carried within container 20 and the relatively large size of the chamber defined by that container, another physical problem arises with our apparatus. If the contained particulate materials be unrestrained, they will tend to agglomerate in a mass with a relatively minimal surface area to volume ratio, commonly as a mass at the bottom of the container by reason of gravity action. When this occurs and water impinges upon the mass, it will impinge firstly upon the peripheral surface and will then have to pass therethrough to hydrate the interior of the agglomerated mass. As the surface of the mass is wetted, it tends to swell and form a gel and this tends to impede the further impingement of water into the mass, as commonly the water passes through various channels that are blocked either completely or partially by the swelling hydrophilic material and the gels formed thereby. The gels normally are reasonably soluble and do pass water by osmosis or otherwise but the passage is much slower than in unwetted material where water enters the mass through channels or voids. It is possible with some gel-forming hydrophilic materials that the gel strength may even be sufficient to substantially prevent the passage of water, especially if any sort of cross-linking activity is present.

To alleviate this problem and to cause a more rapid hydration of the hydrophilic material, we prefer to distribute both the hydrophilic and weighting material in smaller masses throughout the chamber defined by container 20. This may be done in various fashions, the most obvious being that disclosed in the prior art wherein chamber 26 defined in container 20 is divided into separate secondary chambers, generally by sewing the principal container. This method is more or less effective but such compound containers are difficult to manufacture with appropriate portions of the particulate matter within each secondary chamber. Also when this is done by sewing portions of the primary container fabric element 32 together, the composite volume of that container is substantially reduced from that which it might have if it were to define one single chamber.

We prefer to use other means of distributing the dry particulate matter within the container chamber and disclose two of those means as species in the drawings of FIGS. 7, 8, 9 and 10.

Figures 7, 8, 9, 10, 11, 12:
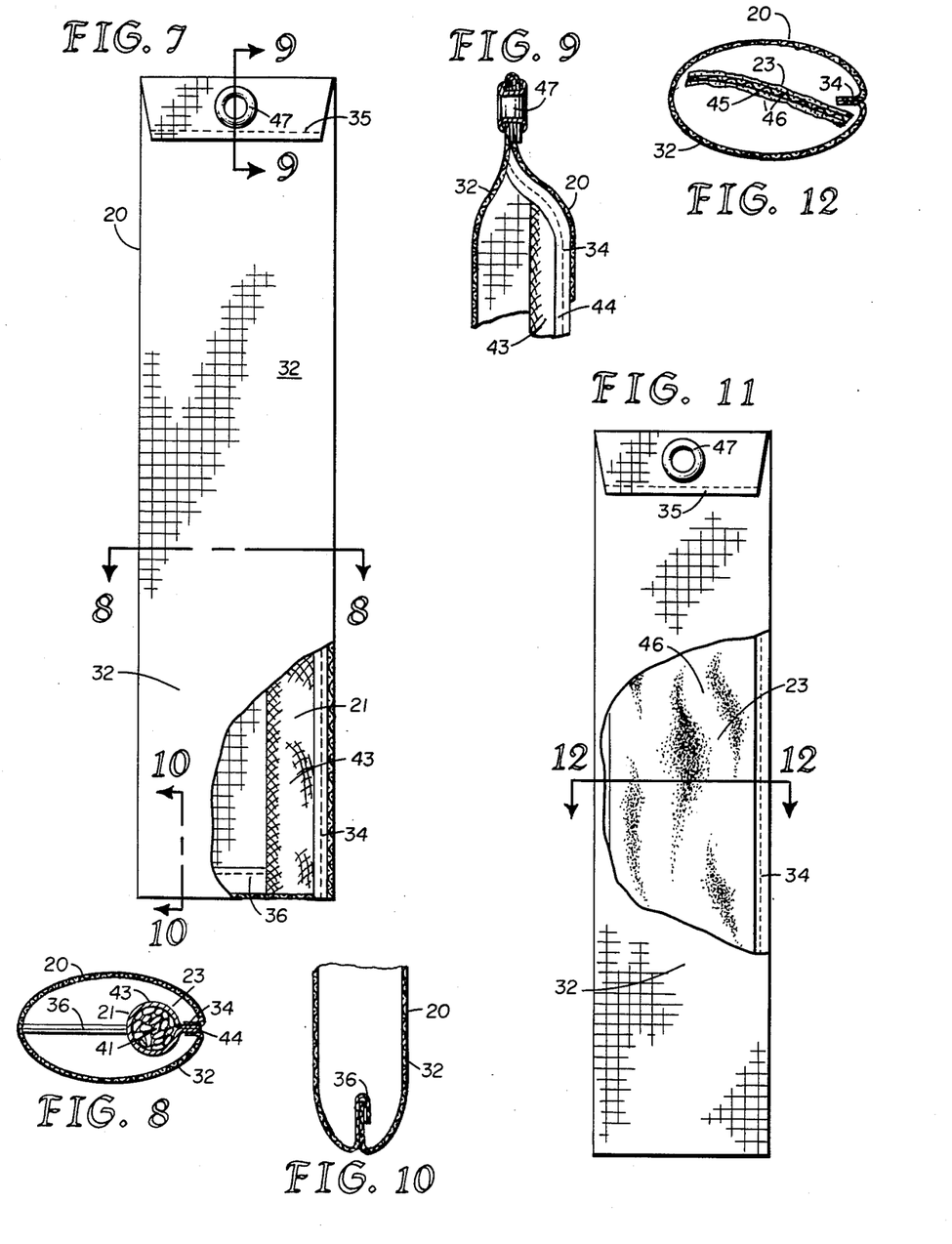
FIG. 7 is a partially cut away orthographic view of a specie of our container, showing a secondary burstable container for the hydrophilic and weighting materials.
FIG. 8 is a horizontal cross-sectional view of the container of FIG. 7, taken on the line 8—8 thereon in the direction indicated by the arrows.
FIG. 9 is a partial, vertical cross-sectional view of the top portion of the container of FIG. 7 taken on the line 9—9 thereon, in the direction indicated by the arrows.
FIG. 10 is a partial, vertical cross-sectional view of the bottom portion of the container of FIG. 7, taken on the line 10—10 thereon, in the direction indicated by the arrows.
FIG. 11 is a partially cut away orthographic view of a container showing a second specie with hydrophilic material coated on a carrying strip.
FIG. 12 is a cross-sectional view through the container of FIG. 11, taken on the line 12—12 thereon in the direction indicated by the arrows.

In FIGS. 7 and 8, the particulate matter comprising weighting and hydrophilic material is contained in secondary container 43. In the form illustrated, this secondary container takes the configuration of an elongate cylinder with a laterally projecting, axially parallel peripheral seam 44 which may be sewn into side seam 34 of container 20 for fastening. The volume of this secondary container is fairly similar to that of the particulate matter contained by it so that the chamber of the secondary container is substantially filled. The secondary container is formed from a material pervious to water and having a relatively low wet strength so that when water impinges upon the contained hydrophilic material it will swell and its swelling will burst the secondary container and allow the wetted hydrophilic material to pass into the chamber defined by container 20. We prefer for such material a paper formed of short fibers and of a relatively thin nature so as not to have substantial wet strength. Common filter paper, toilet paper and the like are typical examples of such product, all of which are commercially available in the present day marketplace. The geometric form of a secondary container or containers may vary widely from that illustrated. They may take the form of a plurality of small packets variously distributed and positioned within the chamber of container 20 or may be otherwise configured and positioned.

The second species illustrated in FIGS. 9 and 10 provides a reinforcement strip 45 with a partially hydralized and somewhat gelled form of hydrophilic material 46 supported on one or both surfaces and carried within the chamber defined by container 20. In the illustration, an elongate strip of cloth, preferably of a porous type having some strength, such as muslin or cheesecloth, is coated with a slurry of hydrophilic material which is allowed to partially dry thereon and be supported thereby. To form such a slurry, I mix approximately 5 percent water with an acrylonitrilestarch type compound, or an appropriate amount of water with other hydrophilic material, to form a thick, viscous composition somewhat of a gelable nature. This composition is mixed with particulate weighting material and is coated on fabric 45, by extrusion or similar means, and allowed to dry until its surface has lost its adhesive nature. The material then is fastened in the interior chamber defined by container 20 by sewing in a seam of the container. The advantage of this particular form of hydrophilic material disbursement is that the entire absorptive structure can be readily folded into a small compact mass for transport or storage.

Since the hydrophilic material of my invention is generally exposed to the atmosphere and is relatively hygroscopic, it is desirable, if not necessary, to protect my device from atmospheric moisture, especially if it be exposed to the atmosphere for lengthy periods prior to use. The most effective method of doing this has been found to be to seal the apparatus in a moisture impervious container such as a bag formed from sheet plastic. Commonly the apparatus is merchandised with such containment. An evacuated or "shrink" type container enhances the container purpose.

Having thusly described the structure of our invention, its operation may be understood.

The hydrophilic apparatus is firstly formed according to the foregoing specifications. The apparatus may differ in size and content of hydrophilic material so long as it remains within the parameter limits specified. In general for convenience of handling and by reason limitation of strength of materials and other parameters, the apparatus will be not more than a few feet long and obviously will have to be small enough in diameter and cross-sectional area to pass through the orifice of a tank to be serviced. The preferred size range of such apparatus is 1 to 6 inches in diameter and not more than 4 feet in length, though obviously these are not absolute physical limitations.

To use the apparatus it is removed from any container and lowered by its manipulative cord 22 through orifice 28 in tank 24 to be serviced until it reaches the bottom of that tank, as evidenced by its restraint from any further downward motion by reason of gravity action. The container descends in the tank, as indicated, by reason of its composite density which is greater than that of either hydrocarbon fuel or water, because of the weighting material carried therein. With the type of apparatus specified and with weighting material distributed in container 20, the apparatus will tend to lie flat within a tank with its longer axis in somewhat of a parallel orientation to the bottom of the tank. This generally is a desirable orientation, as for thin layers of water it generally allows maximum absorption potential.

Prior to the time of insertion of the apparatus within a tank, the end portion of its manipulative cord 22 is attached to some external electrical ground so that the apparatus will be grounded during all operations with it in or about a fuel tank to be serviced. Normally before insertion the container should be maintained for at least a short period of time in contact with tank 24 to be operated upon to assure that the potential of both tank and container are the same.

During passage of the container through the mass of hydrocarbon fuel in tank 24, the coating of polyvinyl alcohol or acrylomide on the container fabric will tend to prevent wetting of that fabric by a hydrocarbon fuel and will also tend to prevent exit of contained particulate matter through the container fabric.

The insertion period of the apparatus within a fuel tank is most commonly the time of highest potential for sparking from electrostatic causes. The generation of such forces is not too well understood, but it is known that if any sieve-like material be moved relative to a mass of hydrocarbon fuel, there is a substantial potential for the generation of static electricity and this occurs as the apparatus is lowered into operative position within a tank. To alleviate sparking problems as much as possible during this process, the end portion of manipulative cord 22 is grounded to an external source (not shown) and the cord itself is maintained in electrical contact with the tank to attempt to assure the same electric potential of ground, tank and container. After the container is placed in the water layer and thereafter during its removal, the container material is generally wetted with water and, by reason thereof, sparking potential is substantially lowered, though in general the same precautions of maintaining electrical contact between ground, manipulative cord and tank should be followed at all times when working with an electrically conductive tank or even with tanks formed of non-conductive material.

Once container 20 enters water mass 31 at the bottom of tank 24 the polyvinyl alcohol or other coating on container fabric 32 is dissolved, at least partially, and water begins entering the chamber defined by container 20. As this occurs, secondary containment material, if used, is wetted and water begins impinging upon the dry particulate hydrophilic material therein. As that hydrophilic material begins hydration, it tends to swell and form a gel which occupies a greater volume that the dry hydrophilic material. As this occurs, the then wetted secondary containment bag is ruptured by the swelling hydrophilic material therein and that hydrophilic material exits into the chamber defined by container 20 generally. The hydrophilic material continues to hydrate until it has reached its capacity and has formed a gel within container 20. This process requires varying periods of time that may be emperically determined, but in general the process is substantially accomplished in containers of 4 inch diameter and 2 foot lengths within two hours.

After the maximum amount of water is absorbed by a particular container, that container is withdrawn upwardly through the fuel mass thereabove and removed from the fuel tank through orifice 28 through which it was initially inserted. The bag may then be disposed of or if desired, the hydrophilic material may be dried and reclaimed. Normally the material is of such relatively low cost that the labor involved in reclaiming it is of greater cost than the value of the hydrophilic material reclaimed and it therefore is generally most economical to waste that material. Since the material is relatively unreactive to hydrocarbon fuels, it normally will not have any substantial amount of those fuels in it and it generally may be wasted to the soil where it forms a desirable soil additive. To do this the container is opened by slitting or otherwise and the gel contained therein merely deposited within or upon the soil.

In any given tank the process may be repeated, simultaneously or sequentially, as many times as necessary with a plurality of hydrophilic apparatus to remove all of the water from a particular tank.

The foregoing description of our invention is necessarily of a detailed nature so that a specific embodiment of it might be set forth as required, but it is to be understood that various modifications of detail, rearrangement and multiplication of parts and processes might be resorted to without departing from its spirit, essence or scope.

Having thusly described our invention, what we desire to protect by Letters Patent, and

What we claim is:

1. An apparatus for removing separated water from contained hydrocarbon fuel comprising, in combination:
    a water pervious fabric container defining a chamber to contain hydrophilic material and having peripheral shape adapted to pass into a tank to be serviced through an orifice and be removed therefrom by an elongate manipulation cord carried thereby;
    a coating on the fabric container that is insoluble in hydrocarbon fuel but soluble in water to prevent absorption of hydrocarbon fuel by the container;
    hydrophilic material carried within the chamber defined by said container, said hydrophilic material being substantially impervious to hydrocarbon fuel and having hydrophilic properties unaffected thereby; and
    means to cause the container and contents to sink in water.

2. The invention of claim 1, further having means of preventing creation of static electrical charges in and on said fabric container and of removing static electrical charges therefrom.

3. The invention of claim 1 further characterized by:
    the water pervious container being formed of a low stretch fabric tightly woven from untwisted filamentuous yarn, said container being coated with polyvinyl alcohol.

4. The invention of claim 1 wherein the hydrophilic material comprises:
    a composition prepared by graft polymerizing acrylonitrile onto starch containing substrata and subjecting this intermediate composition to alkaline saponification.

5. Apparatus for removing water from a container containing separated water and a water insoluble hydrocarbon fuel, comprising in combination:
    a flexible bag-like primary container to contain hydrophilic material in both dry and hydrated states, said container defining a containment chamber and having
        a configuration to allow insertion and removal through an orifice in a tank to be serviced,
        a coating of protective material that is insoluble and non-reactive in hydrocarbon fuel and soluble in water, and
        a flexible manipulative cord of length sufficient to extend from the bottom of a tank to be serviced through an access orifice and a spaced distance therefrom to allow attachment to an external ground;
    dry particulated hydrophilic material carried within the chamber defined by said container, said hydrophilic material being impervious to and nonreactive with hydrocarbon fuel and not having its hydrophilic properties impaired thereby;
    means of preventing the generation of static electricity in and on said container and of removing static electricity therefrom; and
    weighting means of causing the primary container and its contents to sink in water.

6. The invention of claim 5 wherein the primary container is formed of non-stretchable fabric tightly woven of untwisted filamentuous yarn
    with no orifices in the fabric larger than 200 microns and
    the fabric is coated with polyvinyl alcohol to prevent wetting thereof by hydrocarbon fuel.

7. The invention of claim 5 further characterized by:
    the means for removing static electrical charges from the fabric container comprising a network of electrically conductive elements associated with the container fabric and extending therefrom, along the manipulation cord, externally of a tank to be serviced, to a point where the wires may be grounded and
    the container fabric being coated with an antistatic agent insoluble in and non-reactive with hydrocarbon fuel.

8. The invention of claim 5 further characterized by:
    the hydrophilic material being enclosed in a secondary container carried within the chamber defined by the primary container, said secondary container being formed of material pervious to water and having low wet strength so that the secondary container will burst by reason of swelling of hydrating hydrophilic material therein to allow escape of such hydrating hydrophilic material into the chamber defined by the primary container.

9. The invention of claim 5 further characterized by:
    the hydrophilic material being admixed with water to form a viscous partially hydrated gel, said gel being coated on supporting fabric and partially dried, said gel coated fabric being carried within the chamber defined by the primary container.

10. The invention of claim 5 wherein the hydrophilic material is of a dry particulate nature and is selected from the group consisting of an absorbent polymeric composition prepared by graft polymerizing acrylonitrile onto a starch containing substrata and then subjecting the grafted co-polymers to alkaline saponfication, agarose, and polyacrylomides.

11. The invention of claim 5 further characterized by:
the primary container being formed in the configuration of an elongate cylindrical structure and
the weighting means comprising particulated inert material admixed with the hydrophilic material.

12. The invention of claim 5 carried within a container impervious to moisture for storage and transport.

13. The process of removing separated water from a first container containing separated water and water insoluble hydrocarbon fuel comprising, in combination:
containing a dry hydrophilic material that is substantially unaffected by hydrocarbon fuel in a water pervious second container having
a configuration to allow access through an orifice in the first container to be serviced,
a coating of material insoluble and non-reactive in hydrocarbon fuel and soluble in water, and
means of electrically grounding the second container;
electrically grounding the second container externally of the first container to remove static electricity during residence of the second container within the first container;
transporting the second container to the area of the first container whereat water is accumulated;
allowing the hydrophilic material to absorb accumulated impinging water and hydrate to form a gel within the second container; and
removing the hydrated hydrophilic material in the second container from the first container for disposition.

14. The invention of claim 13 further characterized by:
the second container coating material comprising polyvinyl alcohol, and
the hydrophilic material being selected from the group consisting of agarose, polyacrylonitrile and a saponofied graft co-polymer of acrylonitrile on a starch containing substrata.

* * * * *